United States Patent
Groenewolt et al.

(10) Patent No.: US 9,371,469 B2
(45) Date of Patent: *Jun. 21, 2016

(54) COATING AGENT COMPOSITIONS, COATINGS MADE THEREFROM AND EXHIBITING HIGH SCRATCH RESISTANCE AND GOOD POLISHABILITY, AND USE THEREOF

(75) Inventors: Matthijs Groenewolt, Muenster (DE); Guenter Klein, Muenster (DE); Oliver Hilge, Drensteinfurt (DE); Berthold Austrup, Nordkirchen (DE); Katharina Huebner, Drensteinfurt (DE)

(73) Assignee: BASF COATINGS GMBH (DE)

(*) Notice: Subject to any disclaimer, the term of this patent is extended or adjusted under 35 U.S.C. 154(b) by 136 days.

This patent is subject to a terminal disclaimer.

(21) Appl. No.: 14/124,972

(22) PCT Filed: May 23, 2012

(86) PCT No.: PCT/EP2012/059611
§ 371 (c)(1),
(2), (4) Date: Mar. 11, 2014

(87) PCT Pub. No.: WO2012/168079
PCT Pub. Date: Dec. 13, 2012

(65) Prior Publication Data
US 2015/0037590 A1 Feb. 5, 2015

Related U.S. Application Data

(60) Provisional application No. 61/494,910, filed on Jun. 9, 2011.

(30) Foreign Application Priority Data

Jun. 9, 2011 (EP) .................................. 11169292

(51) Int. Cl.
| | | |
|---|---|---|
| *C09D 183/08* | (2006.01) | |
| *B05D 1/38* | (2006.01) | |
| *B05D 1/36* | (2006.01) | |
| *C09D 175/04* | (2006.01) | |
| *B05D 7/00* | (2006.01) | |
| *C08G 18/62* | (2006.01) | |
| *C08G 18/79* | (2006.01) | |
| *C08G 18/28* | (2006.01) | |
| *C08K 5/521* | (2006.01) | |

(52) U.S. Cl.
CPC ................ *C09D 175/04* (2013.01); *B05D 7/53* (2013.01); *C08G 18/289* (2013.01); *C08G 18/6229* (2013.01); *C08G 18/791* (2013.01); *B05D 7/56* (2013.01); *C08K 5/521* (2013.01); *Y10T 428/31551* (2015.04)

(58) Field of Classification Search
CPC ............... C08G 18/289; C08G 18/791; C08G 18/6229; C09D 175/04; B05D 7/53; B05D 7/56; C08K 5/521; Y10T 428/31551
USPC .............. 428/423.1; 524/558; 427/407.1, 314
See application file for complete search history.

(56) References Cited

U.S. PATENT DOCUMENTS

| | | | |
|---|---|---|---|
| 4,598,131 A | 7/1986 | Prucnal | |
| 4,710,542 A | 12/1987 | Forgione et al. | |
| 5,716,678 A | 2/1998 | Rockrath et al. | |
| 6,281,322 B1* | 8/2001 | Groth et al. | ..................... 528/28 |
| 2006/0217472 A1 | 9/2006 | Staunton | |
| 2010/0028544 A1* | 2/2010 | Groenewolt et al. | ......... 427/384 |
| 2010/0143596 A1* | 6/2010 | Groenewolt et al. | ......... 427/379 |
| 2011/0269897 A1 | 11/2011 | Groenewolt et al. | |
| 2014/0065313 A1* | 3/2014 | Groenewolt et al. | ......... 427/387 |

FOREIGN PATENT DOCUMENTS

| | | |
|---|---|---|
| DE | 102008030304 A1 | 12/2009 |
| EP | 0008127 A1 | 2/1980 |
| EP | 0245700 B1 | 11/1987 |

(Continued)

OTHER PUBLICATIONS

International Search Report for International Application No. PCT/EP2012/058355 mailed Aug. 20, 2012, 4 pages.
English Translation of International Search Report for International Application No. PCT/EP2012/058355 mailed Aug. 20, 2012, 3 pages.
Written Opinion for International Application No. PCT/EP2012/058355 mailed Aug. 20, 2012, 6 pages.

(Continued)

*Primary Examiner* — Thao T Tran
(74) *Attorney, Agent, or Firm* — Cantor Colburn LLP

(57) ABSTRACT

Compositions comprising (B1) at least one polyisocyanate-group-containing compound (B1) having free or blocked isocyanate groups and a cycloaliphatic polyisocyanate parent structure, and/or a polyisocyanate derived therefrom, and (B2) at least one polyisocyanate-group-containing compound (B2) having free or blocked isocyanate groups and an acyclic, aliphatic polyisocyanate parent structure, and/or a polyisocyanate derived therefrom, where at least one of component (B1) and component (B2) comprise at least one structural unit selected from the group of structural unit (I)

$$—NR—(X—SiR''_x(OR')_{3-x}) \quad (I),$$

structural unit (II)

$$—N(X—SiR''_x(OR')_{3-x})_n(X'—SiR''_y(OR')_{3-y})_m \quad (II),$$

and mixtures of two or more of the foregoing, wherein the compound (B1) is in an amount such that the binder fraction of the compound (B1) is between 5% and 45% by weight, based on the sum of the binder fraction of the compound (B1) and of the compound (B2), and the mixture of components (B1) and (B2) includes structural units (I) and structural units (II).

15 Claims, No Drawings

(56) References Cited

FOREIGN PATENT DOCUMENTS

| | | |
|---|---|---|
| EP | 0249201 A2 | 12/1987 |
| EP | 0276501 A2 | 8/1988 |
| EP | 0994117 A1 | 4/2000 |
| EP | 0692007 B1 | 12/2001 |
| EP | 1273640 A2 | 1/2003 |
| WO | WO9422968 A1 | 10/1994 |
| WO | WO9712945 A1 | 4/1997 |
| WO | WO0109260 A1 | 2/2001 |
| WO | WO0198393 A1 | 12/2001 |
| WO | WO2005003440 A1 | 1/2005 |
| WO | WO2007033786 A1 | 3/2007 |
| WO | WO2007037857 A1 | 4/2007 |
| WO | WO2008074489 A1 | 6/2008 |
| WO | WO2008074490 A1 | 6/2008 |
| WO | WO2008074491 A1 | 6/2008 |
| WO | WO2009077181 A1 | 6/2009 |
| WO | WO2010040540 A1 | 4/2010 |
| WO | WO2010149236 A1 | 12/2010 |
| WO | WO2011131463 A1 | 10/2011 |

OTHER PUBLICATIONS

International Search Report for International Application No. PCT/EP2012/059611 mailed Sep. 4, 2012, 4 pages.
English Translation of International Search Report for International Application No. PCT/EP2012/059611 mailed Sep. 4, 2012, 2 pages.
Written Opinion for International Application No. PCT/EP2012/059611 mailed Sep. 4, 2012, 5 pages.
U.S. Appl. No. 14/124,869, filed Dec. 9, 2013.
Römpp Lexikon "Lacke und Druckfarben," Georg Thieme Verlag, Stuttgart, 1998, pp. 250 to 252.
B. Singh, P.S. Forgione, J.a. Sedlak, L. Anderson, "Carbamylmethylated Melamines, Novel Crosslinkers for the Coatings Industry", Advanced Organic Coatings Science and Technology Series, 1991, pp. 193 to 207, vol. 13, Stamford, CT.
English Translation of International Preliminary Report on Patentability for International Application No. PCT/EP2012/058355 issued Dec. 10, 2013, 6 pages.
English Translation of International Preliminary Report on Patentability for International Application No. PCT/EP2012/059611 issued Dec. 10, 2013, 5 pages.

* cited by examiner

COATING AGENT COMPOSITIONS, COATINGS MADE THEREFROM AND EXHIBITING HIGH SCRATCH RESISTANCE AND GOOD POLISHABILITY, AND USE THEREOF

CROSS REFERENCE TO RELATED APPLICATIONS

This application is a National Phase Application of Patent Application PCT/EP2012/059611 filed on 23 May 2012, which claims priority to U.S. 61/494,910, filed 9 Jun. 2011 and EP11169292.7 filed 9 Jun. 2011, of which all aforementioned applications are incorporated by reference herein in their entirety.

FIELD OF THE INVENTION

The present invention relates to nonaqueous coating material compositions comprising at least one polyhydroxyl-group-containing compound, at least polyisocyanate having free or blocked isocyanate groups and having silane groups, and/or the dimer and/or oligomer thereof, and at least one catalyst (D) for the crosslinking of the silane groups.

BACKGROUND OF THE INVENTION

Coating materials of this kind are known from, for example, WO 08/74491, WO 08/74490, WO 08/74489, WO 09/077181 and WO 10/149236. The compound (B) used in these coating materials, containing isocyanate groups and silane groups, is based on known isocyanates, preferably on the biuret dimers and isocyanurate trimers of diisocyanates, more particularly of hexamethylene diisocyanate. These coating material compositions have the advantage over conventional polyurethane coating materials of a significantly improved scratch resistance in combination with good weathering resistance. In need of improvement with these coating materials, however, are the sandability and polishability of the resultant coatings.

Furthermore, EP-A-1 273 640 describes two-component coating materials comprising a polyol component and a crosslinker component, consisting of aliphatic and/or cycloaliphatic polyisocyanates or the polyisocyanates derived therefrom by polymerization, allophanate formation, biuret formation or urethane formation, where 0.1 to 95 mol % of the originally free isocyanate groups present have undergone reaction with bisalkoxy-silylamine. These coating materials can be used for producing clearcoats or topcoats in the automotive sector, and, following their complete curing, exhibit good scratch resistance in combination with good resistance to environment effects. This specification, however, contains no information on how the sandability and polishability of the resulting coatings can be improved.

WO 07/033786, furthermore, discloses coating materials which as well as phosphonic diesters and diphosphonic diesters, as catalyst (A), comprise silane-group-containing mixtures (B), such as, for example, the mixture of the isocyanate-group-free reaction product (B1) of hexamethylene diisocyanate isocyanurate with N,N-bis(3-trimethoxysilyl-propan-1-yl)amine and the isocyanate-group-free reaction product (B2) of isophorone diisocyanate isocyanurate with N-(3-trimethoxysilylpropan-1-yl)-N-n-butylamine, and also optionally, as further additives (C), polyacrylate resins or other binders and crosslinking agents. According to their hardness, the coatings produced from these coating materials again exhibit good scratch resistance combined with good resistance towards chemicals and environmental effects, but the weathering resistance is in need of improvement and the resultant coatings are decidedly brittle. Additionally, here again, there is a lack of details as to how the sandability and polishability of the resultant coatings can be improved.

WO 2001/98393 describes two-component coating materials comprising a polyol as binder component and also, as crosslinker component, a mixture of a polyisocyanate (A) and a silane oligomer (B) which contains at least two isocyanate groups and additionally alkoxysilane groups, preferably bisalkoxysilane groups, and which is prepared by reaction of a polyisocyanate (PI) with alkoxysilylamines, preferably with bisalkoxysilylamines, more particularly with bis(3-propyltri-methoxy-silyl)amine. As polyisocyanate (A) and also as polyisocyanate (PI) for preparing component (B) it is preferred to use hexamethylene diisocyanate and isophorone diisocyanate and also their biurets and isocyanurates. These coating materials are used more particularly as primers and are optimized for adhesion to metallic substrates, preferably to aluminum substrates. Details of how the scratch resistance, on the one hand, but also, at the same time, the sandability and polishability of the resultant coatings may be improved are, however, not present in this specification.

It is known, moreover, from US 2006-0217472 A1 that the scratch resistance of coatings based on polyurethanes may be improved by taking coating materials which comprise a hydroxyl-group-containing binder, an isocyanate-group-containing crosslinker and a metal catalyst for the OH/NCO reaction and adding thereto an amino silane, such as bis(3-propyltrimethoxysilyl)amine, for example, or reaction products thereof with isocyanates.

WO 07/037857, lastly, discloses coating materials which as well as polyhydroxyl-group-containing compounds and polyisocyanate-group-containing compounds comprise 1% to 10% by weight of a silylated dimer fatty acid alcohol obtained by reaction of dimer fatty acid alcohol with isocyanate-functional silanes. The coatings obtained using these coating materials are notable in particular for a very high gloss. As the fraction of the silylated dimer fatty acid alcohols in the coating materials goes up, the hardness and the resistance towards solvents, measured in terms of double rubs with methyl ethyl ketone, of the resultant coatings goes down. In the automotive finishing sector, however, the requirement is increasingly for coatings featuring improved hardness and durability and hence an improved scratch resistance.

A problem addressed by the present invention, therefore, was that of providing coating material compositions, more particularly for automotive OEM finishing and automotive refinishing, that lead to coatings that are scratch-resistant to a high degree and more particularly exhibit high gloss retention after scratch exposure. At the same time, however, the resultant coatings ought also to ensure good sandability and good polishability.

Furthermore, coating material compositions ought to be provided that lead to a network that is weathering-stable to a high degree and that, at the same time, ensure high acid resistance. Moreover, the coatings and paint systems, especially the clearcoats, ought to be able to be produced even in film thicknesses >40 µm without stress cracks occurring. The coating materials, furthermore, ought to meet the requirements typically imposed on the clearcoat of automotive OEM finishes and automotive refinishes.

The new coating materials, lastly, ought to be preparable easily and very reproducibly, and ought not to present any environmental problems in the course of paint application.

SUMMARY OF THE INVENTION

In light of the objectives stated above, nonaqueous coating material compositions have been found, comprising (A) at least one polyhydroxyl-group-containing compound (A), (B1) at least one polyisocyanate-group-containing compound (B1) having free or blocked isocyanate groups and having a cycloaliphatic polyisocyanate parent structure and/or a polyisocyanate parent structure that is derived from one such cycloaliphatic polyisocyanate by trimerization, dimerization, urethane formation, biuret formation, uretdione formation and/or allophanate formation, (B2) at least one polyisocyanate-group-containing compound (B2), different from component (B1), having free or blocked isocyanate groups and having an acyclic, aliphatic polyisocyanate parent structure and/or a polyisocyanate parent structure that is derived from one such acyclic aliphatic polyisocyanate by trimerization, dimerization, urethane formation, biuret formation, uretdione formation and/or allophanate formation, and (D) at least one catalyst (D) for the crosslinking of silane groups, where component (B1) and/or component (B2) comprise at least one structural unit of the formula (I)

           (I), and/or at least one structural unit of the formula (II)

           (II), where

R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, R'=hydrogen, alkyl or cycloalkyl it being possible for the carbon chain to be interrupted by nonadjacent oxygen, sulfur or NRa groups, where Ra=alkyl, cycloalkyl, aryl or aralkyl, preferably R'=ethyl and/or methyl, X, X'=linear and/or branched alkylene or cycloalkylene radical having 1 to 20 carbon atoms, preferably X, X'=alkylene radical having 1 to 4 carbon atoms, R"=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms, n=0 to 2, m=0 to 2, m+n=2, and x, y=0 to 2, with the provisos that (i) component (B1) is used in an amount such that the binder fraction of component (B1) is between 5% and 45% by weight, based in each case on the sum of the binder fraction of component (B1) plus the binder fraction of component (B2), and (ii) the mixture of components (B1) plus (B2) includes structural units (I) and structural units (II).

The present invention further provides multistage coating processes using these coating material compositions, and also the use of the coating material compositions as clearcoat and application of the coating process for automotive OEM finishing, for automotive refinishing and/or for the coating of parts for installation in or on motor vehicles, of plastics substrates and/or of utility vehicles.

It is surprising and was not foreseeable that the coating material compositions lead to coatings which are scratch-resistant to a high degree and in particular exhibit high gloss retention after scratch exposure, but at the same time also ensure good sandability and good polishability of the resultant coatings.

Furthermore, the coating material compositions lead to a network which is weathering-stable to a high degree, and at the same time ensure high acid resistance of the coatings. Moreover, the coatings and paint systems, especially the clearcoats, can be produced even in film thicknesses >40 μm without stress cracks occurring. The coating materials, over and above this, meet the requirements typically imposed on the clearcoat in automotive OEM finishes and automotive refinishes.

Lastly, the new coating materials can be prepared easily and very reproducibly, and do not present any environmental problems during paint application.

DETAILED DESCRIPTION OF AN EMBODIMENT OF THE INVENTION

The Coating Materials of the Invention

The coating materials of the invention are, in particular, thermally curable coating materials—that is, preferably, coating materials which are substantially free from radiation-curable unsaturated compounds, and more particularly are completely free from radiation-curable unsaturated compounds.

The Polyhydroxyl-Group-Containing Compound (A)

As polyhydroxyl-group-containing compound (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have mass-average molecular weights Mw>500 daltons, measured by means of gel permeation chromatography (GPC) against a polystyrene standard, preferably of between 800 and 100 000 daltons, more particularly of between 1000 and 50 000 daltons.

Particularly preferred are polyester polyols, polyurethane polyols, polysiloxane polyols, polyacrylate polyols and/or polymethacrylate polyols, and also copolymers thereof, referred to below as polyacrylate polyols.

The polyols preferably have an OH number of 30 to 400 mg KOH/g, more particularly between 100 and 300 KOH/g. The hydroxyl number (OH number) indicates how many mg of potassium hydroxide are equivalent to the amount of acetic acid bound in acetylation by 1 g of substance. For the determination, the sample is boiled with acetic anhydride-pyridine and the resultant acid is titrated with potassium hydroxide solution (DIN 53240-2). In the case of pure poly(meth)acrylates, the OH number can also be determined with sufficient precision by calculation on the basis of the OH-functional monomers used.

The glass transition temperatures, measured by means of DSC measurements in accordance with DIN-EN-ISO 11357-2, of the polyols are preferably between −150 and 100° C., more preferably between −120° C. and 80° C.

Suitable polyester polyols are described in EP-A-0 994 117 and EP-A-1 273 640, for example. Polyurethane polyols are prepared preferably by reaction of polyester polyol prepolymers with suitable di- or polyisocyanates and are described in EP-A-1 273 640, for example. Suitable polysiloxane polyols are described in WO-A-01/09260, for example, it being possible to employ the polysiloxane polyols recited therein preferably in combination with further polyols, more particularly those having higher glass transition temperatures.

With very particular preference, component (A) comprises one or more polyacrylate polyols and/or polymethacrylate polyols. Together with the polyacrylate polyol(s) and/or polymethacrylate polyol(s), it is possible to use further oligomeric and/or polymeric polyhydroxyl-group-containing compounds, examples being polyester polyols, polyurethane polyols and polysiloxane polyols, more particularly polyester polyols.

The poly(meth)acrylate polyols that are especially preferred in accordance with the invention are generally copolymers and preferably have mass-average molecular weights Mw of between 1000 and 20 000 daltons, more particularly of between 1500 and 10 000 daltons, measured in each case by means of gel permeation chromatography (GPC) against a polystyrene standard.

The glass transition temperature of the copolymers is generally between −100 and 100° C., more particularly between −60 and <20° C. (measured by means of DSC measurements in accordance with DIN EN ISO 11357-2).

The poly(meth)acrylate polyols preferably have an OH number of 60 to 300 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed in the neutralization of 1 g of the compound in question (DIN EN ISO 2114).

As hydroxyl-containing monomer units it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and, more particularly, 4-hydroxybutyl acrylate and/or 4-hydroxybutyl methacrylate.

As further monomer units for the poly(meth)acrylate polyols it is preferred to use alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, more particularly, cyclohexyl acrylate and/or cyclohexyl methacrylate.

As further monomer units for the poly(meth)acrylate polyols it is possible to use vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, more particularly, acrylic and/or methacrylic acid.

Hydroxyl-Containing Compounds (C)

The coating material compositions of the invention may optionally comprise, in addition to the polyhydroxyl-group-containing component (A), one or more monomeric hydroxyl-containing compounds (C) which are different from component (A). These compounds (C) preferably account for a fraction of 0% to 20% by weight, more preferably of 0% to 10% by weight, very preferably of 1% to 5% by weight, based in each case on the binder fraction of the coating material composition.

As hydroxyl-containing compound (C), low molecular mass polyols are used.

Low molecular mass polyols used are, for example, diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also polyols, such as preferably trimethylolethane, trimethylolpropane, trimethylolhexane, 1,2,4-butanetriol, pentaerythritol and dipentaerythritol. Such low molecular mass polyols are preferably admixed in minor fractions to the polyol component (A).

The Combination of Component (B1) and Component (B2)
The Acyclic, Aliphatic Polyisocyanate Component (B2)

It is essential to the invention that the coating materials comprise at least one polyisocyanate-group-containing compound (B2), different from component (B1), which has free or blocked isocyanate groups and has an acyclic, aliphatic polyisocyanate parent structure and/or a polyisocyanate parent structure derived from one such acyclic aliphatic polyisocyanate by trimerization, dimerization, urethane formation, biuret formation, uretdione formation and/or allophanate formation.

The acyclic aliphatic polyisocyanates serving as parent structures for the polyisocyanate-group-containing compounds (B2) used in accordance with the invention are preferably conventional substituted or unsubstituted aliphatic polyisocyanates. Examples of preferred polyisocyanates (B2) are tetramethylene 1,4-diisocyanate, hexamethylene 1,6-diisocyanate, 2,2,4-trimethylhexane 1,6-diisocyanate, ethylene diisocyanate, 1,12-dodecane diisocyanate and mixtures of the aforementioned polyisocyanates.

Additionally preferred polyisocyanate parent structures for component (B2) are the polyisocyanates derived from one such acyclic aliphatic polyisocyanate by trimerization, dimerization, urethane formation, biuret formation, uretdione formation and/or allophanate formation, more particularly the biuret dimer and/or the allophanate dimer and/or the isocyanurate trimer. In a further embodiment of the invention, the polyisocyanate parent structures for component (B2) are polyisocyanate prepolymers having urethane structural units that are obtained by reacting polyols with a stoichiometric excess of aforementioned acyclic aliphatic polyisocyanates. Polyisocyanate prepolymers of this kind are described in U.S. Pat. No. 4,598,131, for example.

Particularly preferred polyisocyanate parent structures for component (B2) are hexamethylene diisocyanate and/or its biuret dimer and/or allophanate dimer and/or isocyanurate trimer.

The acyclic aliphatic polyisocyanates and/or their polyisocyanates derived by trimerization, dimerization, urethane formation, biuret formation, uretdione formation and/or allophanate formation that are employed as component (B2) may additionally comprise at least one structural unit (I) of the formula (I)

—NR—(X—SiR"$_x$(OR')$_{3-x}$)  (I), and/or at least one structural unit of the formula (II)

—N(X—SiR"$_x$(OR')$_{3-x}$)$_n$(X'—SiR"$_y$(OR')$_{3-y}$)$_m$  (II), where

R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, R'=hydrogen, alkyl or cycloalkyl it being possible for the carbon chain to be interrupted by nonadjacent oxygen, sulfur or NRa groups, where Ra=alkyl, cycloalkyl, aryl or aralkyl, preferably R'=ethyl and/or methyl, X, X'=linear and/or branched alkylene or cycloalkylene radical having 1 to 20 carbon atoms, preferably X, X'=alkylene radical having 1 to 4 carbon atoms, R"=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms, n=0 to 2, m=0 to 2, m+n=2, and x, y=0 to 2.

As component (B2) it is preferred to use acyclic aliphatic polyisocyanates having free or blocked isocyanate groups, and/or their polyisocyanates having free or blocked isocyanate groups that are derived by trimerization, dimerization, urethane formation, biuret formation and/or allophanate formation, that include at least one structural unit (I) of the formula (I) and at least one structural unit of the formula (II).

The respective preferred alkoxy radicals (OR') may be the same or different—what is critical for the structure of the radicals, however, is to what extent they influence the reactivity of the hydrolyzable silane groups. Preferably R' is an alkyl radical, more particularly having 1 to 6 C atoms. Particularly preferred are radicals R' which raise the reactivity of the silane groups, i.e. represent good leaving groups. Accordingly, a methoxy radical is preferred over an ethoxy radical, which is in turn preferred over a propoxy radical. With particular preference, therefore, R'=ethyl and/or methyl, more particularly methyl.

The reactivity of organofunctional silanes may also, moreover, be influenced considerably by the length of the spacers X, X' between silane functionality and organic functional groups used for reaction with the constituent that is to be modified. As an example of this, mention may be made of the "alpha"-silanes, which are available from Wacker, and in which there is a methylene group, rather than the propylene group present in the case of "gamma"-silanes, between Si atom and functional group.

The components (B2) functionalized with the structural units (I) and/or (II), and used with preference in accordance with the invention, are obtained in particular by reacting acyclic aliphatic polyisocyanates and/or their polyisocyanates derived by trimerization, dimerization, urethane formation, biuret formation, uretdione formation and/or allophanate formation with at least one compound of the formula (Ia)

H—NR—(X—SiR"$_x$(OR')$_{3-x}$)     (Ia), and/or with at least one compound of formula (IIa)

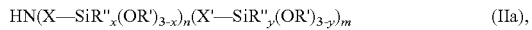
HN(X—SiR"$_x$(OR')$_{3-x}$)$_n$(X'—SiR"$_y$(OR')$_{3-y}$)$_m$     (IIa), the substituents having the definition stated above.

The components (B2) functionalized with the structural units (I) and (II) that are used with particular preference in accordance with the invention are obtained with particular preference by reacting acyclic aliphatic polyisocyanates and/or their polyisocyanates derived by trimerization, dimerization, urethane formation, biuret formation, uretdione formation and/or allophanate formation
with at least one compound of the formula (Ia) and with at least one compound of the formula (IIa),
the substituents having the definition stated above.

Compounds (IIa) preferred in accordance with the invention are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Especially preferred is bis(3-propyltrimethoxysilyl)amine. Aminosilanes of this kind are available, for example, under the brand name DYNASYLAN® from DEGUSSA or Silquest® from OSI.

Compounds (Ia) preferred in accordance with the invention are amino-alkyltrialkoxysilanes, such as preferably 2-aminoethyltrimethoxysilane, 2-aminoethyltriethoxysilane, 3-aminopropyltrimethoxysilane, 3-aminopropyl-triethoxysilane, 4-aminobutyltrimethoxysilane, 4-aminobutyltriethoxysilane. Particularly preferred compounds (Ia) are N-(2-(trimethoxysilyl)ethyl)alkylamines, N-(3-(trimethoxysilyl)propyl)alkylamines, N-(4-(trimethoxysilyl)-butyl)alkylamines, N-(2-(triethoxysilyl)ethyl)alkylamines, N-(3-(triethoxy-silyl)propyl)alkylamines and/or N-(4-(triethoxysilyl)butyl)alkylamines. Especially preferred is N-(3-(trimethoxysilyl)propyl)butylamine.

Aminosilanes of this kind are available, for example, under the brand name DYNASYLAN® from DEGUSSA or Silquest® from OSI.

In component (B2) preferably between 10 and 90 mol %, more preferably between 20 and 80 mol % and very preferably between 30 and 70 mol % of the isocyanate groups originally present have undergone reaction to form structural units (I) and/or (II), preferably structural units (I) and (II).

The Cycloaliphatic Polyisocyanate Component (B1)

It is essential to the invention that the coating materials comprise at least one polyisocyanate-group-containing compound (B1) having free or blocked isocyanate groups and having a cycloaliphatic polyisocyanate parent structure and/or a polyisocyanate parent structure derived from one such cycloaliphatic polyisocyanate by trimerization, dimerization, urethane formation, biuret formation, uretdione formation and/or allophanate formation.

The cycloaliphatic polyisocyanates used as parent structures for the polyisocyanate-group-containing compounds (B1) used in accordance with the invention are preferably conventional substituted or unsubstituted cycloaliphatic polyisocyanates. Examples of preferred polyisocyanates (B1) are isophorone diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g. Desmodur® W from Bayer AG) and mixtures of the aforementioned polyisocyanates.

Additionally preferred polyisocyanate parent structures for component (B1) are the polyisocyanates derived from one such cycloaliphatic polyisocyanate by trimerization, dimerization, urethane formation, biuret formation, uretdione formation and/or allophanate formation, more particularly the biuret dimer and/or the allophanate dimer and/or the isocyanurate trimer. In a further embodiment of the invention, the polyisocyanate parent structures for component (B1) are polyisocyanate prepolymers having urethane structural units that are obtained by reacting polyols with a stoichiometric excess of aforementioned cycloaliphatic polyisocyanates. Polyisocyanate prepolymers of this kind are described in U.S. Pat. No. 4,598,131, for example.

Particularly preferred cycloaliphatic polyisocyanates (B1) are isophorone diisocyanate and 4,4'-methylenedicyclohexyl diisocyanate and/or their biuret dimers and/or their allophanate dimers and/or their isocyanurate trimers.

The cycloaliphatic polyisocyanates used as component (B1) and/or their polyisocyanates derived by trimerization, dimerization, urethane formation, biuret formation, uretdione formation and/or allophanate formation may further comprise at least one structural unit (I) of the formula (I) and/or at least one structural unit of the formula (II).

The components (B1) functionalized with the structural units (I) and/or (II) are obtained preferably by reacting cycloaliphatic polyisocyanates and/or their polyisocyanates derived by trimerization, dimerization, urethane formation, biuret formation, uretdione formation and/or allophanate formation with at least one compound of the formula (Ia)

$$H\!-\!NR\!-\!(X\!-\!SiR''_x(OR')_{3-x}) \quad (Ia),$$

and/or with at least one compound of the formula (IIa)

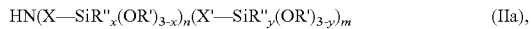

$$HN(X\!-\!SiR''_x(OR')_{3-x})_n(X'\!-\!SiR''_y(OR')_{3-y})_m \quad (IIa),$$

the substituents having the definition stated above.

In component (B1) preferably 0 to 34 mol %, preferably less than 5.0 mol %, more preferably less than 2.5 mol % and very preferably none of the isocyanate groups originally present have undergone reaction to form structural units (I) and/or structural units (II).

It is essential to the invention that the mixture of components (B1) plus (B2) includes structural units (I) and structural units (II). If, therefore, component (B1) contains only structural units (I), but no structural units (II), then component (B2) necessarily contains structural units (II) and also, optionally, structural units (I) as well. If component (B1) contains only structural units (II), but no structural units (I), then component (B2) necessarily contains structural units (I) and also, optionally, structural units (II) as well.

If, therefore, component (B2) contains only structural units (I), but no structural units (II), then component (B1) necessarily contains structural units (II) and also, optionally, structural units (I) as well. If component (B2) contains only structural units (II), but no structural units (I), then component (B1) necessarily contains structural units (I) and also, optionally, structural units (II) as well.

Preferred coating material compositions are obtained when the total amount of structural units (I) in the mixture of component (B1) plus component (B2) is between 3 and 90 mol %, preferably between 5 and 70 mol %, more preferably between 10 and 50 mol %, very preferably between 10 and 40 mol %, based in each case on the entirety of the structural units (I) plus (II), and the total amount of structural units (II) in the mixture of component (B1) plus component (B2) is between 97 and 10 mol %, preferably between 95 and 30 mol %, more preferably between 90 and 50 mol % and very preferably between 90 and 60 mol %, based in each case on the entirety of the structural units (I) plus (II).

Preferably, in the mixture of the polyisocyanate component (B1) plus the polyisocyanate component (B2), between 10 and 80 mol %, preferably between 20 and 70 mol %, more preferably between 25 and less than 50 mol % and very preferably between 31 and 45 mol % of the isocyanate groups originally present in (B1) plus (B2) have undergone reaction to form structural units (I) and/or (II), preferably structural units (I) and (II).

Component (B1) is used in an amount such that the binder fraction of component (B1) is between 5% and 45% by weight, preferably between 10% and 40% by weight and more preferably between 15% and 35% by weight, based in each case on the sum of the binder fraction of component (B1) plus the binder fraction of component (B2).

In particular, the component (B1) is used in an amount such that the binder fraction of the isocyanate-group-containing parent structure of component (B1) is between 5% and 45% by weight, preferably between 10% and 40% by weight and more preferably between 15% and 35% by weight, based in each case on the sum of the binder fraction of the isocyanate-group-containing parent structure of component (B1) plus the binder fraction of the isocyanate-group-containing parent structure of component (B2).

Particularly preferred coating material compositions are obtained if, in the mixture of component (B1) plus component (B2), the total amount of structural units (I) is between 10 and 50 mol % and the total amount of structural units (II) is between 90 and 50 mol %, based in each case on the entirety of the structural units (I) plus (II), and between 25 and less than 50 mol % of the isocyanate groups originally present in (B1) plus (B2) have undergone reaction to form structural units (I) and (II)

and component (B1) is used in an amount such that the binder fraction of component (B1) is between 15% and 35% by weight, based in each case on the sum of the binder fraction of component (B1) plus the binder fraction of component (B2), where, in particular, (B1) is used in an amount such that the binder fraction of the isocyanate-group-containing parent structure of component (B1) is between 15% and 35% by weight, based in each case on the sum of the binder fraction of the isocyanate-group-containing parent structure of component (B1) plus the binder fraction of the isocyanate-group-containing parent structure of component (B2).

In a further embodiment of the invention, the polyhydroxyl-group-containing compound (A), in addition to the hydroxyl groups, includes structural units of the formula (I) and/or of the formula (II).

Structural units of the formula (I) can be introduced into the compound (A) by incorporation of monomer units having such structural units or by reaction of polyols having further functional groups with a compound of the formula (Ia), the substituents having the definition stated above. Structural units of the formula (II), analogously, can be introduced into the compound (A) by incorporation of monomer units having such structural units or by reaction of polyols which have further functional groups with a compound of the formula (IIa), the substituents having the definition stated above. For the reaction of the polyol with the compound (Ia) and/or (IIa), accordingly, said polyol has further functional groups which react with the secondary amino group of the compound (Ia) and/or (IIa), such as, more particularly, acid groups or epoxy groups.

Monomer building blocks which carry the structural elements (I) and/or (II) are preferably reaction products of acrylic acid and/or of methacrylic acid or of epoxy-group-containing alkyl acrylates and/or methacrylates with the abovementioned compounds (Ia) and/or (IIa).

Suitable polyhydroxyl-group-containing compounds (A) having structural units of the formula (I) and/or of the formula (II) are also described in WO 08/74489 at page 21 line 21 to page 23 line 18.

Catalyst (D)

The coating material compositions of the invention preferably comprise at least one catalyst (D) for the crosslinking of the silane groups. Examples are metal complexes with chelate ligands based on zinc or aluminum, such as the Lewis acids or titanates described in WO 05/03340, for example, but in selecting the catalysts it must be ensured that they do not lead to yellowing of the coating materials. Moreover, certain catalysts it is known to use are less desirable, on toxicological grounds.

It is therefore preferred, as catalyst (D), to use phosphorus-containing, more particularly phosphorus-containing and nitrogen-containing, catalysts. In this context it is also possible to use mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of this kind are described in German Patent Application DE-A-102005045228, for example.

More particularly, however, substituted phosphoric monoesters and phosphoric diesters are used, preferably from the group consisting of acyclic phosphoric diesters and cyclic phosphoric diesters, more preferably amine adducts of phosphoric monoesters and diesters.

Used with especial preference as catalyst (D) are the corresponding amine-blocked phosphoric esters, and, of these, more particularly amine-blocked ethylhexyl phosphates and amine-blocked phenyl phosphates, especially preferably amine-blocked phosphoric acid bis(2-ethylhexyl) esters.

Examples of amines with which the phosphoric esters are blocked are, in particular, tertiary amines, examples being bicyclic amines, such as diazabicyclooctane (DABCO), diazabicyclononene (DBN), diazabicycloundecene (DBU), dimethyldodecylamine or triethylamine, for example. Particularly preferred for blocking the phosphoric esters is the use of tertiary amines, which ensure high activity of the catalyst at the curing conditions of 140° C.

Certain amine-blocked phosphoric acid catalysts are also available commercially (e.g. Nacure products from King Industries). An example that may be mentioned is that with the designation Nacure 4167 from King Industries, as a particularly suitable catalyst based on an amine-blocked phosphoric acid partial ester.

The catalysts are used preferably in fractions of 0.01% to 20% by weight, more preferably in fractions of 0.1% to 10% by weight, based on the binder fraction of the coating material composition of the invention. A lower level of activity on the part of the catalyst may be partially compensated by correspondingly higher quantities employed.

The coating material compositions of the invention may further comprise another amine catalyst based on a bicyclic amine, more particularly on an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01% to 20% by weight, more preferably in fractions of 0.1% to 10% by weight, based on the binder fraction of the coating material composition of the invention.

The Combination of Components (A), (B1), (B2), Optionally (C) and (D) and Also Further Components of the Coating Material Compositions Where the coating material compositions are one-component compositions, polyisocyanate-group-containing compounds (B1) and (B2) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole and the like. With particular preference, the isocyanate groups of components (B1) and (B2) are blocked with 3,5-dimethylpyrazole.

In the case of the 2-component coating material compositions particularly preferred in accordance with the invention, shortly before the coating material is applied, one coatings component, comprising the polyhydroxyl-group-containing compound (A) and also further components, described below, is mixed with a further coatings component, comprising the polyisocyanate-group-containing compounds (B1) and (B2) and also, optionally, further of the components described below, mixing taking place in a conventional way, with, generally speaking, the coatings component that comprises the compound (A) comprising the catalyst (D) and also part of the solvent.

The polyhydroxyl-group-containing component (A) may be present in a suitable solvent. Suitable solvents are those which allow sufficient solubility of the polyhydroxyl-group-containing component.

In accordance with the invention it is preferred to use coating material compositions which comprise from 20% to 80% by weight, preferably from 30% to 69.9% by weight, based in each case on the binder fraction of the coating material composition, of at least one polyhydroxyl-group-containing compound (A), more particularly of at least one polyhydroxyl-group-containing polyacrylate (A) and/or of at least one polyhydroxyl-group-containing polymethacrylate (A).

In accordance with the invention it is preferred to use coating material compositions which comprise from 80% to 20% by weight, preferably from 69.9% to 30% by weight, based in each case on the binder fraction of the coating material composition, of the mixture comprising at least one polyisocyanate component (B1) plus at least one polyisocyanate component (B2).

The coating material compositions preferably comprise the compounds (C) in a fraction of 0% to 20% by weight, more preferably of 0% to 10% by weight, very preferably of 1% to 5% by weight, based in each case on the binder fraction of the coating material composition.

The weight fractions of the polyol (A) and optionally (C) and of the polyisocyanates (B1) and (B2) are preferably selected such that the molar equivalents ratio of the hydroxyl groups of the polyhydroxyl-group-containing compound (A) plus optionally (C) to the isocyanate groups of components (B1) plus (B2) is between 1:0.5 and 1:1.5, preferably between 1:0.8 and 1:1.2, more preferably between 1:0.9 and 1:1.1.

The polyhydroxyl-group-containing component (A), the polyhydroxyl component (C) and/or the polyisocyanate component (B1) and/or (B2) may be present in a suitable solvent.

Solvents (L) suitable for the coating materials of the invention are especially those which in the coating material are chemically inert towards the compounds (A), (B1), (B2) and optionally (C) and which also do not react with (A), optionally (C), (B1) and (B2) during the curing of the coating material. Examples of such solvents are aliphatic and/or aromatic hydrocarbons such as toluene, xylene, solvent naphtha, Solvesso 100 or Hydrosol® (ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforesaid solvents. The aprotic solvents or solvent mixtures preferably have a water content of not more than 1% by weight, more preferably not more than 0.5% by weight, based on the solvent.

The solvent or solvents are used in the coating material compositions of the invention preferably in an amount such that the solids content of the coating material composition is at least 50% by weight, more preferably at least 60% by weight.

Besides the compounds (A), (B1), (B2) and optionally (C) it is also possible for further binders (E) to be used, which are able preferably to react and form network nodes with the hydroxyl groups of the poly(meth)acrylate (A) and/or with the free isocyanate groups of the compound (B) and/or with the alkoxysilyl groups of the compounds (B).

As component (E) it is possible for example to use amino resins and/or epoxy resins. The customary and known amino resins are contemplated, some of whose methylol and/or methoxymethyl groups may have been defunctionalized by means of carbamate or allophanate groups. Crosslinking agents of this kind are described in patent specifications U.S. Pat. No. 4,710,542 and EP-B-0 245 700 and also in the article by B. Singh and co-workers, "Carbamylmethylated Melamines, Novel Crosslinkers for the Coatings Industry" in Advanced Organic Coatings Science and Technology Series, 1991, volume 13, pages 193 to 207.

Generally speaking, such components (E) are used in fractions of up to 40% by weight, preferably of up to 30% by weight, more preferably of up to 25% by weight, based on the binder fraction of the coating material composition of the invention.

The binder mixture of the invention or the coating material composition of the invention may further comprise at least one customary and known coatings additive (F) in effective amounts, i.e. in amounts preferably up to 30% by weight, more preferably up to 20% by weight and more particularly up to 10% by weight, based in each case on the binder fraction of the coating material composition.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only on reaction with further constituents and/or water, such as Incozol or aspartic esters, for example;
wetting agents different from components (A) and (C), such as siloxanes, fluorine-containing compounds, carboxylic monoesters, phosphoric esters, polyacrylic acids and copolymers thereof or polyurethanes;
adhesion promoters;
flow control agents;
film-forming auxiliaries such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, as disclosed in EP-A-0 008 127, for example; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers having ionic and/or associative groups, such as poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
flame retardants.

Particularly preferred are coating material compositions which comprise
30% to 69.9% by weight, based on the binder fraction of the coating material composition, of at least one polyhydroxyl-group-containing polyacrylate (A) and/or at least one polyhydroxyl-group-containing polymethacrylate (A),
69.9% to 30% by weight, based on the binder fraction of the coating material composition, of the polyisocyanate-group-containing compounds (B1) plus (B2),
0% to 10% by weight, based on the binder fraction of the coating material composition, of the hydroxyl-containing component (C),
0.1% to 10% by weight, based on the binder fraction of the coating material composition of the invention, of at least one catalyst (D),
0% to 15% by weight, based on the binder fraction of the coating material composition, of one or more amino resins and/or one or more tris(alkoxycarbonylamino)triazines (E) and
0% to 20% by weight, based on the binder fraction of the coating material composition, of at least one customary and known coatings additive (F).

The binder fraction of the coating material composition is determined, prior to crosslinking, by weighing a small sample (P) of the coating material composition and subsequently determining its solids content by drying it at 130° C. for 60 minutes, cooling it and then weighing it again. The residue corresponds to the binder fraction of the sample (P). The binder fraction of the coating material composition, in % by weight, is then given, correspondingly, by 100 multiplied by the quotient formed from the weight of the residue of the sample (P) after drying at 130° C., divided by the weight of the sample (P) prior to drying.

The binder fraction of the individual components (A) or (B1) or (B2) or (C) of the coating material is determined analogously by weighing a small sample (P) of the respective component (A) or (B1) or (B2) or (C) and subsequently determining its solids content by drying it at 130° C. for 60 minutes, cooling it and then weighing it again. The binder fraction of the component in % by weight is then given, correspondingly, by 100 multiplied by the quotient formed from the weight of the residue of the respective sample (P) after drying at 130° C., divided by the weight of the respective sample (P) prior to drying.

In a further embodiment of the invention, the binder mixture of the invention or the coating material composition of the invention may further comprise additional pigments and/or fillers and may serve for the production of pigmented topcoats or pigmented undercoats or primer-surfacers, more particularly of pigmented topcoats. The pigments and/or fillers employed for these purposes are known to the skilled person. The pigments are used typically in an amount such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of utility vehicles.

The application of the coating material compositions of the invention may take place by any of the customary application methods, such as, for example, spraying, knifecoating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating materials has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of utility vehicles, relatively low temperatures are typically employed here, of preferably between 20 and 80° C., more particularly between 20 and 60° C.

The coating materials of the invention are outstandingly suitable as decorative, protective and/or effect coatings and finishes on bodywork of means of transport (especially motor vehicles, such as cycles, motorcycles, buses, lorries or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or precoated substrate, the coating materials of the invention being either pigmented or unpigmented. The coating material compositions and paint systems of the invention in particular, more particularly the clearcoats, are employed in the technologically and aesthetically particularly demanding field of automotive OEM finishing and for the coating of plastics parts for installation in or on car bodies, more particularly for top-class car bodies, such as, for example, for producing roofs, hatches, bonnets, fenders, bumpers, spoilers, cills, protective strips, side trim and the like, and for the finishing of utility vehicles, such as, for example, of lorries, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene/acrylonitrile polymers, in which graft copolymers of vinylaromatic compounds, more particularly styrene and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines 50 et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment) is coated first with a pigmented basecoat film and thereafter with a film with the coating material composition of the invention.

EXAMPLES

Preparation Example for the Curative System VB2-1, Used in Comparative Example V1, Based on the Isocyanurate of Hexamethylene Diisocyanate (Degree of Silanization Based on NCO Molar: 34 Mol %, Molar Ratio of the Structural Units (I) to the Structural Units (II)=50:50)

In a reaction vessel, 33.5 parts by weight of trimerized hexamethyl 1,6-diisocyanate (Desmodur® N3300, Bayer, Leverkusen) and 28 parts by weight of butyl acetate are introduced. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 6.1% by weight. The resulting mixture has a theoretical solids content of 64% by weight.

Preparation Example for the Curative System (B1-1) Plus (B2-1), Used in Inventive Example B1 (Molar Ratio of the Structural Units (I) to the Structural Units (II) in the Compound (B2-1)=50:50, a Degree of Silanization of the Compound (B2-1) of 41 Mol %, Corresponding to a Degree of Silanization, Based on the Isocyanate Groups Originally Present in Compound (B1-1) Plus Compound (B2-1), of 34 Mol %, and a Binder Fraction of the Compound (B1-1) of 20% by Weight, Based on the Sum of the Binder Fraction of Compound (B1-1) and the Binder Fraction of Compound (B2-1))

In a reaction vessel, 28 parts by weight of trimerized hexamethyl 1,6-diisocyanate (Desmodur® N3300, Bayer, Leverkusen) and 24 parts by weight of butyl acetate are introduced. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 5.2% by weight. Then 10 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 65% by weight.

Preparation Example for the Curative System (B1-2) Plus (B2-2), Used in Inventive Example B2 (Molar Ratio of the Structural Units (I) to the Structural Units (II) in the Compound (B2-2)=20:80, a Degree of Silanization of the Compound (B2-2) of 41 Mol %, Corresponding to a Degree of Silanization, Based on the Isocyanate Groups Originally Present in Compound (B1-2) Plus Compound (B2-2), of 34 Mol %, and a Binder Fraction of the Compound (B1-2) of 20% by Weight, Based on the Sum of the Binder Fraction of Compound (B1-2) and the Binder Fraction of Compound (B2-2))

In a reaction vessel, 28 parts by weight of trimerized hexamethyl 1,6-diisocyanate (Desmodur® N3300, Bayer, Leverkusen) and 21 parts by weight of butyl acetate are introduced. With reflux cooling, nitrogen blanketing and stirring, a mixture of 3.0 parts by weight of N-[3-(trimethoxysilyl)propyl]butylamine (Dynasylan® 1189, EVONIK, Rheinfelden) and 16.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 5.3% by weight. Then 10 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 69% by weight.

Preparation Example for the Curative System (B1-3) Plus (B2-3), Used in Inventive Example B3 (Molar Ratio of the Structural Units (I) to the Structural Units (II) in the Compound (B2-3)=20:80, a Degree of Silanization of the Compound (B2-3) of 41 Mol %, Corresponding to a Degree of Silanization, Based on the Isocyanate Groups Originally Present in Compound (B1-3) Plus Compound (B2-3), of 34 Mol %, and a Binder Fraction of the Compound (B1-3) of 30% by Weight, Based on the Sum of the Binder Fraction of Compound (B1-3) and the Binder Fraction of Compound (B2-3))

In a reaction vessel, 27 parts by weight of trimerized hexamethyl 1,6-diisocyanate (Desmodur® 3300, Bayer, Leverkusen) and 21 parts by weight of butyl acetate are introduced. With reflux cooling, nitrogen blanketing and stirring, a mixture of 3.0 parts by weight of N-[3-(trimethoxysilyl)propyl]butylamine (Dynasylan® 1189, EVONIK, Rheinfelden) and 17.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 4.8% by weight. Then 16.5 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 69% by weight.

Preparation Example for the Curative System (B1-4) Plus (B2-4), Used in Inventive Example B4 (Molar Ratio of the Structural Units (I) to the Structural Units (II) in the Compound (B2-4)=30:70, a Degree of Silanization of the Compound (B2-4) of 53 Mol %, Corresponding to a Degree of Silanization, Based on the Isocyanate Groups Originally Present in Compound (B1-4) Plus Compound (B2-4), of 40 Mol %, and a Binder Fraction of the Compound (B1-4) of 30% by Weight, Based on the Sum of the Binder Fraction of Compound (B1-4) and the Binder Fraction of Compound (B2-4))

In a reaction vessel, 27 parts by weight of trimerized hexamethyl 1,6-diisocyanate (Desmodur® 3300, Bayer, Leverkusen) and 11 parts by weight of butyl acetate are introduced. With reflux cooling, nitrogen blanketing and stirring, a mixture of 5.0 parts by weight of N-[3-(trimethoxysilyl)propyl]butylamine (Dynasylan® 1189, EVONIK, Rheinfelden) and 18.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 4.5% by weight. Then 16.5 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 79% by weight.

Preparation Example for the Curative System (B1-5) Plus (B2-5), Used in Inventive Example B5 (Molar Ratio of the Structural Units (I) to the Structural Units (II) in the Compound (B2-5)=10:90, a Degree of Silanization of the Compound (B2-5) of 33 Mol %, Corresponding to a Degree of Silanization, Based on the Isocyanate Groups Originally Present in Compound (B1-5) Plus Compound (B2-5), of 31 Mol %, and a Binder Fraction of the Compound (B1-5) of 5% by Weight, Based on the Sum of the Binder Fraction of Compound (B1-5) and the Binder Fraction of Compound (B2-5))

In a reaction vessel, 24 parts by weight of trimerized hexamethyl 1,6-diisocyanate (Desmodur® 3300, Bayer, Leverkusen) and 22 parts by weight of butyl acetate are introduced. With reflux cooling, nitrogen blanketing and stirring, a mixture of 1.0 part by weight of N-[3-(trimethoxysilyl)propyl]butylamine (Dynasylan® 1189, EVONIK, Rheinfelden) and 12.5 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 5.9% by weight. Then 2.0 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 63% by weight.

Preparation Example for the Curative System (B1-6) Plus (B2-6), Used in Inventive Example B6 (Molar Ratio of the Structural Units (I) to the Structural Units (II) in the Compound (B2-6)=20:80, a Degree of Silanization Based on the Isocyanate Groups Originally Present in Compound (B1-6) Plus Compound (B2-6), of 34 Mol %, and a Binder Fraction of the Compound (B1-6) of 30% by Weight, Based on the Sum of the Binder Fraction of Compound (B1-6) and the Binder Fraction of Compound (B2-6))

In a reaction vessel, 27 parts by weight of trimerized hexamethyl 1,6-diisocyanate (Desmodur® 3300, Bayer, Leverkusen), 16.5 parts by weight of trimerized isophorone diisocyanate (Desmodur® Z4470, 70% strength in solvent naphtha) and 21 parts by weight of butyl acetate are introduced. With reflux cooling, nitrogen blanketing and stirring, a mixture of 3.0 parts by weight of N-[3-(trimethoxysilyl)propyl]butylamine (Dynasylan® 1189, EVONIK, Rheinfelden) and 17.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 6.1% by weight. The resulting mixture has a theoretical solids content of 69% by weight.

Table 1 below summarizes the characteristics of the curative mixtures of the inventive examples and of the comparative example:

TABLE 1

|  | VB1 | B1-1 + B2-1 | B1-2 + B2-2 | B1-3 + B2-3 | B1-4 + B2-4 | B1-5 + B2-5 | B1-6 + B2-6 |
|---|---|---|---|---|---|---|---|
| Degree of silanization[1] (mol %) | 34 | 34 | 34 | 34 | 40 | 31 | 34 |
| Molar ratio of (I) to (II), based on (I) + (II)[2] | 50:50 | 50:50 | 20:80 | 20:80 | 30:70 | 10:90 | 20:80 |
| Binder fraction of the compound (B1)[3] (% by weight) | — | 20 | 20 | 30 | 30 | 5 | 30 |

Key to table 1

[1] Degree of silanization in mol %, based in each case on the isocyanate groups present originally (i.e. before reaction with (Ia) and (IIa)) in (B1) plus (B2)

[2] Molar mixing ratio in mol % of structural units (I) to structural units (II), based in each case on the sum of the structural units (I) plus structural units (II)

[3] Binder fraction of the compound (B1) in % by weight, based in each case on the sum of the binder fraction of compound (B1) and the binder fraction of compound (B2)

Preparation Example

Binder (A1) for Millbase

In a double-wall 4-l stainless-steel vessel, heatable by means of oil circulation thermostat and equipped with thermometer, anchor stirrer, 2 dropping funnels and reflux condenser, solvent for the polymerization is introduced. One of the dropping funnels is charged with the monomer mixture, the second dropping funnel with the initiator solution, comprising a suitable initiator (generally a peroxide). The initial charge is heated to a polymerization temperature of 140° C. When the polymerization temperature has been reached, the initiator feed is commenced first. 15 minutes after the beginning of the initiator feed, the monomer feed (duration: 240 minutes) is commenced. The initiator feed is set such that it continues for 30 minutes after the end of the monomer feed. After the end of the initiator feed, the mixture is stirred at 140° C. for a further 2 hours and then cooled to room temperature. The reaction mixture is subsequently adjusted with solvent to the solids content indicated in table 2.

TABLE 2 composition of the polymethacrylate (A1) in parts by weight and characteristics of the polymethacrylate (A1) (acid number determined experimentally, OHN calculated theoretically, Tg calculated theoretically)

| Component | Parts by weight |
| --- | --- |
| Styrene | 8.0 |
| n-Butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |
| Solids 1 h 150° C. | 65% |
| Acid number (measured) [mg KOH/g] | 8-12 |
| OH number (calculated) [mg KOH/g] | 175 |
| Tg (FOX) [° C.] | −27 |

Formulation of the Coating Materials of Inventive Examples B1 to B6 and of the Coating Material of Comparative Example V1, and Also of the Corresponding Coatings of Examples 1 to 6 and of Comparative Example V1

For the production of the millbase S1, the constituents indicated in table 3 are weighed out in the order stated (beginning from the top) into a suitable vessel, in this order, and stirred together intimately with one another.

TABLE 3

Composition of the millbase (S1) in parts by weight

| Item | Component | Parts by weight |
| --- | --- | --- |
| 1 | Polyacrylate (A1) | 75 |
| 2 | TINUVIN ® 384[1] | 1.5 |
| 3 | TINUVIN ® 292[2] | 1.5 |
| 4 | BYK ® 325[3] | 0.2 |
| 5 | Butyl acetate | 23 |
| 6 | Nacure ® 4167[4] | 2.3 |

Key to table 3:
[1] Tinuvin ® 384 = commercial light stabilizer based on a benzotriazole, from BASF S.E.
[2] Tinuvin ® 292 = commercial light stabilizer based on a sterically hindered amine, from BASF S.E.
[3] Byk 325 = commercial, polyether-modified polymethylalkylsiloxane from Byk Chemie
[4] Nacure ® 4167 = commercial catalyst based on amine-blocked phosphoric acid partial ester, from King Industries, nonvolatile fraction 25%

TABLE 4

Composition of the coating materials of examples B1 to B6 and of comparative example V1

| | Comp. Ex. V1 | Ex. B1 | Ex. B2 | Ex. B3 | Ex. B4 | Ex. B5 | Ex. B6 |
| --- | --- | --- | --- | --- | --- | --- | --- |
| Millbase (S1) | 100 | 100 | 100 | 100 | 100 | 100 | 100 |
| Curing agent VB1 | 100 | — | — | — | — | — | — |
| Curative mixture B1-1 + B2-1 | — | 100 | — | — | — | — | — |
| Curative mixture B1-2 + B2-2 | — | — | 100 | — | — | — | — |
| Curative mixture B1-3 + B2-3 | — | — | — | 100 | — | — | — |
| Curative mixture B1-4 + B2-4 | — | — | — | — | 100 | — | — |
| Curative mixture B1-5 + B2-5 | — | — | — | — | — | 100 | — |
| Curative mixture B1-6 + B2-6 | — | — | — | — | — | — | 100 |

For the preparation of the coating materials of examples B1 to B6 and of comparative example V1, the constituents indicated in table 4 are weighed out in the order stated (starting from the top) into a suitable vessel, in this order, and stirred together intimately with one another. The resulting coating materials of examples B1 to B6 and of comparative example V1 are applied using a gravity-feed cup gun to Bonder metal panels, coated with black aqueous basecoat, and are baked at 140° C. for 20 minutes. After 2 hours of storage at ambient temperature, a sanding site is applied the cured clearcoat panel (using excentric compressed-air vibrating sander from 3M, 10 000 rpm, sanding disk: 3M Trizact 3000 grade). This sanding site is subsequently polished up with polishing paste (rotary polishing operation, lambs wool disk, polishing paste: Menzerna Nanopoliercreme PO 106 FA). Haze and gloss are subsequently determined using the micro-haze plus gloss meter from Byk. The test results are set out in table 5.

The scratch resistance of the resultant coatings was tested using the car wash simulation test with a laboratory wash system from AMTEC-Kistler in accordance with DIN20566. The response was determined by measuring the residual gloss of the sample using the micro-haze plus gloss meter from Byk after 10 and 50 cycles in the AMTEC-Kistler system, with subsequent wiping with a cotton pad soaked with wash benzine.

TABLE 5

Test results of the coatings of examples B1 to B6 and of comparative example V1

| | Comp. Ex. V1 | Ex. B1 | Ex. B2 | Ex. B3 | Ex. B4 | Ex. B5 | Ex. B6 |
| --- | --- | --- | --- | --- | --- | --- | --- |
| Gloss (20°) untreated | 87 | 86 | 88 | 88 | 88 | 88 | 88 |
| Haze untreated | 7 | 6 | 7 | 6 | 6 | 6 | 6 |
| Gloss (20°) after 9 s polishing time | 65 | 68 | 80 | 84 | 80 | 65 | 83 |
| Gloss (20°) after 12 s polishing time | 73 | 78 | 84 | 85 | 84 | 76 | 84 |
| Haze after 9 s polishing time | 103 | 95 | 47 | 40 | 42 | 100 | 41 |
| Haze after 12 s polishing time | 74 | 40 | 20 | 12 | 13 | 50 | 12 |
| Residual gloss 20° in % after 10 cycles | 90 | 80 | 85 | 85 | 87 | 86 | 84 |
| Residual gloss 20° in % after 50 cycles | 70 | 55 | 65 | 60 | 66 | 66 | 61 |

Discussion of the Test Results

Both the corresponding haze values and the corresponding gloss values are relevant, since high measured gloss units are a necessary, but not sufficient, condition. Whereas high gloss units show a good impression when a polished surface is viewed straight on, high haze values may lead to a cloudy/milky appearance if the surface is viewed at a slightly oblique angle. The aim is to come as closely and quickly as possible to the unexposed gloss values and haze values.

It is clearly evident that the inventive addition of the IPDI-based curing agent B1-1 results after a polishing time of just 12 s in a gloss value of close to 80 units, whereas the corresponding coating without addition of the IPDI-based curing agent B1-1, in the comparative example (V1), leads to a gloss value of only just above 70 units. The difference is evident even more clearly here from the corresponding haze values: the inventive addition of the IPDI-based curing agent B1-1 leads to a haze value after a polishing time of just 12 s of just 40 units, whereas the corresponding coating without addition of the IPDI-based curing agent B1-1, in the comparative example (V1), leads to a substantially higher haze value of 74 units.

The outcome can be improved significantly further still through the use of the curative mixtures (B1-2) plus (B2-2), (B1-3) plus (B2-3), (B1-4) plus (B2-4) and (B1-6) plus (B2-6), with optimized ratio of the structural units (I) to the structural units (II) in component (B2), leading to coatings which, after polishing exposure and after 12 s polishing time, are visually no longer distinguishable from the untreated material. In addition, these examples B2 to B4 and B6, with an optimized ratio of the structural units (I) to the structural units (II) in component (B2), are notable for a scratch resistance which is improved relative to that of example B1.

Coating material compositions with a high binder fraction of the polyisocyanate component (B1) (e.g. of 50 or more % by weight, based in each case on the sum of the binder fraction of component (B1) plus the binder fraction of component (B2)) result in coatings having a significantly weaker scratch resistance.

The invention claimed is:

1. A nonaqueous coating material composition comprising
(A) at least one polyhydroxyl-group-containing compound (A),
(B1) at least one polyisocyanate-group-containing compound (B1) having free or blocked isocyanate groups and having a cycloaliphatic polyisocyanate parent structure and/or a polyisocyanate parent structure that has free or blocked isocyanate groups and that is derived from one such cycloaliphatic polyisocyanate by trimerization, dimerization, urethane formation, biuret formation, uretdione formation and/or allophanate formation,
(B2) at least one polyisocyanate-group-containing compound (B2), different from component (B1), having free or blocked isocyanate groups and having an acyclic, aliphatic polyisocyanate parent structure and/or a polyisocyanate parent structure that has free or blocked isocyanate groups and that is derived from one such acyclic aliphatic polyisocyanate by trimerization, dimerization, urethane formation, biuret formation, uretdione formation and/or allophanate formation, and
(D) at least one catalyst (D) for the crosslinking of silane groups, where one or both of component (B1) and component (B2) comprise at least one structural unit selected from the group consisting of the structural unit of the formula (I),

—NR—(X—SiR''$_x$(OR')$_{3-x}$)     (I), the structural unit of the formula (II)

—N(X—SiR''$_x$(OR')$_{3-x}$)$n$(X'—SiR''$_y$(OR')$_{3-y}$)$_m$     (II), and mixtures of two or more of the foregoing,
where
R=hydrogen, alkyl, cycloalkyl, aryl or aralkyl, it being possible for the carbon chain to be interrupted by non-adjacent oxygen, sulfur or NRa groups, where Ra=alkyl, cycloalkyl, aryl or aralkyl,
R'=hydrogen, alkyl or cycloalkyl it being possible for the carbon chain to be interrupted by nonadjacent oxygen, sulfur or NRa groups,
X, X'=linear and/or branched alkylene or cycloalkylene radical having 1 to 20 carbon atoms,
R''=alkyl, cycloalkyl, aryl or aralkyl, it being possible for the carbon chain to be interrupted by nonadjacent oxygen, sulfur or NRa groups,
n=0 to 2, m=0 to 2, m+n=2, and x, y=0 to 2,
with the provisos that (i) the amount of component (B1) is between 5 and 45% by weight, based on the sum of the amount of component (B1) and the amount of component (B2), (ii) the mixture of components (B1) and (B2) includes structural units (I) and structural units (II), and (iii) the coating material composition comprises from 20% to 80% by weight, based on solids content of the coating material composition, of at least one hydroxyl-containing polyacrylate (A) and/or at least one hydroxyl-containing polymethacrylate (A).

2. The coating material composition of claim 1, characterized in that the amount of component (B1) is between 10% and 40% by weight of the sum of the amount of component (B1) plus the amount of component (B2).

3. The coating material composition claim 1, characterized in that the amount of the isocyanate-group-containing parent structure of component (B1) is between 5% and 45% by weight of the sum of the amount of the isocyanate-group-containing parent structure of component (B1) plus the amount of the isocyanate-group-containing parent structure of component (B2).

4. The coating material composition of claim 1, characterized in that the total amount of structural units (I) in the mixture of component (B1) plus component (B2) is between 3 and 90 mol %, based on the entirety of the structural units (I) plus (II), and the total amount of structural units (II) in the mixture of component (B1) plus component (B2) is between 97 and 10 mol %, based on the entirety of the structural units (I) plus (II).

5. The coating material composition of claim 1, characterized in that the polyisocyanate parent structure of the compound (B1) is the biuret dimer and/or the allophanate dimer and/or the isocyanurate trimer of a cycloaliphatic polyisocyanate and/or the polyisocyanate parent structure of the compound (B2) is the biuret dimer and/or the allophanate dimer and/or the isocyanurate trimer of an acyclic aliphatic polyisocyanate.

6. The coating material composition of claim 1, characterized in that the polyisocyanate parent structure of the compound (B1) is selected from the group consisting of isophorone diisocyanate, 4,4'-methylenedicyclohexyl diisocyanate, the isocyanurate trimer thereof, the allophanate dimer thereof, the biuret dimer thereof, and mixtures of two or more of the foregoing, and/or the polyisocyanate parent structure of the compound (B2) is selected from the group consisting of 1,6-hexamethylene diisocyanate, the isocyanurate trimer thereof, the allophanate dimer thereof, the biuret dimer thereof, and mixtures of two or more of the foregoing.

7. The coating material composition of claim 1, characterized in that the component (B2) has been prepared by reacting acyclic aliphatic polyisocyanates and/or a polyisocyanate derived from one such acyclic aliphatic polyisocyanate by trimerization, dimerization, urethane formation, biuret formation, uretdione formation and/or allophanate formation with at least one compound of the formula (Ia)

   (Ia)

and/or with at least one compound of the formula (IIa)

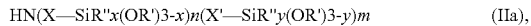   (IIa), the substituents having the definition stated in claim 1.

8. The coating material composition of claim 1, characterized in that in component (B2) between 10 and 90 mol % of the isocyanate groups originally present have undergone reaction to form structural units (I) and/or (II), and/or in that in the mixture of polyisocyanate component (B1) plus polyisocyanate component (B2) between 10 and 80 mol %, of the isocyanate groups originally present in (B1) plus (B2) have undergone reaction to form structural units (I) and/or (II).

9. The coating material composition of claim 1, characterized in that component (B1) has been prepared by reacting cycloaliphatic polyisocyanates and/or polyisocyanates derived from cycloaliphatic polyisocyanates by trimerization, dimerization, urethane formation, biuret formation, uretdione formation or allophanate formation with at least one compound of formula (Ia) and/or with at least one compound of formula (IIa), the substituents having the definition stated in claim 1, and where in component (B1) 0 to 34 mol % of the isocyanate groups originally present have undergone reaction to form structural units (I) and/or (II).

10. The coating material composition of claim 1, characterized in that in the mixture of component (B1) plus component (B2)

the total amount of structural units (I) is between 10 and 50 mol % and the total amount of structural units (II) in the mixture of component (B1) plus component (B2) is between 90 and 50 mol %, based in each case on the entirety of the structural units (I) plus (II), and between 25 and less than 50 mol % of the isocyanate groups originally present in (B1) plus (B2) have undergone reaction to form structural units (I) and (II)

and the amount of component (B1) is between 15% and 35% by weight of the sum of the amount of component (B1) plus the amount of component (B2).

11. The coating material composition of claim 1, characterized in that the coating material composition comprises at least one phosphorus- and nitrogen-containing catalyst (D).

12. A multicoat effect and/or color paint system comprising at least one pigmented basecoat and at least one clearcoat disposed thereon, the clearcoat comprising a film produced from a coating material composition according to claim 1.

13. A multistage coating process comprising applying a pigmented basecoat film to an optionally precoated substrate, and applying a film of the coating material composition of claim 1 atop the applied basecoat film.

14. The multistage coating process of claim 13, comprising initially drying the applied basecoat at temperatures from room temperature to 80° C., and after the application of the coating material composition of claim 1, curing the applied coating material composition at temperatures from 20 to 200° C. for a time of one minute up to 10 hours.

15. A method of coating a substrate, comprising applying the coating material composition of claim 1 to a substrate as a clearcoat, wherein the substrate is selected from the group consisting of substrates for automotive OEM finishing, parts for installation in or on motor vehicles and/or of utility vehicles, substrates for automotive refinishing, and mixtures of two or more of the foregoing.

\* \* \* \* \*